United States Patent
Maeng et al.

(10) Patent No.: US 10,122,156 B2
(45) Date of Patent: Nov. 6, 2018

(54) DEVICE FOR FIXING PIPE AND ELECTRIC WIRE

(71) Applicant: HANON SYSTEMS, Daejeon (KR)

(72) Inventors: Chan Joo Maeng, Daejeon (KR); Dae Woong Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/512,630

(22) PCT Filed: Aug. 26, 2015

(86) PCT No.: PCT/KR2015/008932
§ 371 (c)(1),
(2) Date: Mar. 20, 2017

(87) PCT Pub. No.: WO2016/143961
PCT Pub. Date: Sep. 15, 2016

(65) Prior Publication Data
US 2017/0373476 A1 Dec. 28, 2017

(30) Foreign Application Priority Data

Mar. 11, 2015 (KR) .................. 10-2015-0033740
Aug. 26, 2015 (KR) .................. 10-2015-0120314

(51) Int. Cl.
| | | |
|---|---|---|
| *H02G 3/22* | (2006.01) | |
| *H02G 3/04* | (2006.01) | |
| *B60R 16/02* | (2006.01) | |
| *B60H 1/00* | (2006.01) | |
| *H02G 3/38* | (2006.01) | |
| *B60R 16/03* | (2006.01) | |
| *H02G 7/20* | (2006.01) | |

(52) U.S. Cl.
CPC ....... *H02G 3/0418* (2013.01); *B60H 1/00371* (2013.01); *B60H 1/00571* (2013.01);
(Continued)

(58) Field of Classification Search
CPC ............. H01L 23/4093; Y10T 24/1394; Y10T 24/44923; Y10T 24/44; Y10T 403/7176; B60R 13/0206; F16L 33/03
(Continued)

(56) References Cited

U.S. PATENT DOCUMENTS

| | | | |
|---|---|---|---|
| 6,995,316 B1 * | 2/2006 | Goto .................... | H02G 15/013 16/2.1 |
| 7,709,755 B2 * | 5/2010 | Pfister ................. | B60R 16/0222 16/2.1 |

(Continued)

FOREIGN PATENT DOCUMENTS

| | | |
|---|---|---|
| GB | 2476092 A | 6/2011 |
| JP | 2002301927 A | 10/2002 |

(Continued)

*Primary Examiner* — Steven M Marsh
(74) *Attorney, Agent, or Firm* — Dickinson Wright PLLC (57) ABSTRACT

The present invention relates to a device for fixing a pipe and an electric wire that fastenedly blocks a fastening hole formed on a vehicle roof by means of a first connection member adapted to pass the pipe therethrough and a second connection member adapted to pass the electric wire therethrough, thus reducing the number of fastening holes formed on the vehicle roof and achieving easy assembling. According to the present invention, the device includes: a first connection member having a first through hole adapted to pass the pipe therethrough and a hollow portion formed on a given region thereof; and a second connection member having a second through hole adapted to pass the electric wire therethrough, wherein the second connection member has the corresponding shape to the hollow portion in such a manner as to be integrally formed with the first connection member, so that the first connection member and the second connection member block a fastening hole formed on a given region of a vehicle.

17 Claims, 12 Drawing Sheets

(52) U.S. Cl.
CPC ...... *B60R 16/0215* (2013.01); *B60R 16/0222* (2013.01); *H02G 3/22* (2013.01); *H02G 3/281* (2013.01); *B60H 2001/00235* (2013.01); *B60R 16/03* (2013.01); *H02G 7/20* (2013.01)

(58) Field of Classification Search
USPC .................. 248/56, 74.2, 74.3, 316.7, 230.1
See application file for complete search history.

(56) References Cited

U.S. PATENT DOCUMENTS

| | | | | |
|---|---|---|---|---|
| 8,690,273 | B2* | 4/2014 | Dolinsek | F25D 23/028 |
| | | | | 312/223.6 |
| 8,746,633 | B1* | 6/2014 | Medlin, Jr. | F16L 3/00 |
| | | | | 174/481 |
| 8,872,043 | B2* | 10/2014 | Roseen | H02G 15/22 |
| | | | | 174/650 |
| 9,038,967 | B2* | 5/2015 | Struck | F16L 3/2235 |
| | | | | 248/68.1 |
| 9,350,152 | B2* | 5/2016 | Andresen | H02G 3/085 |
| 9,379,530 | B2* | 6/2016 | Smutny | H02G 3/22 |

FOREIGN PATENT DOCUMENTS

| | | |
|---|---|---|
| JP | 2005242008 A | 9/2005 |
| JP | 2007067970 A | 3/2007 |
| KR | 200428606 Y1 | 10/2006 |
| KR | 100760639 B1 | 9/2007 |
| KR | 10082334 B1 | 4/2008 |

* cited by examiner

Fig. 1

PRIOR ART

DEVICE FOR FIXING PIPE AND ELECTRIC WIRE

CROSS-REFERENCE TO RELATED APPLICATIONS

This application is a U.S. National Stage of International Application No. PCT/KR2015/008932, filed Aug. 26, 2015, which claims the benefit and priority of KR 10-2015-0033740 filed Mar. 11, 2015 and KR 10-2015-0120314 filed Aug. 26, 2015. The entire disclosures of each of the above applications are incorporated herein by reference.

TECHNICAL FIELD

The present invention relates to a device for fixing a pipe and an electric wire, and more particularly, to a device for fixing a pipe and an electric wire that fastenedly blocks a fastening hole formed on a vehicle roof by means of a first connection member adapted to pass the pipe therethrough and a second connection member adapted to pass the electric wire therethrough, thus reducing the number of fastening holes formed on the vehicle roof and achieving easy assembling.

BACKGROUND ART

Generally, an air conditioner for a vehicle is a device that cools or heats the interior of the vehicle in summer or winter or removes the frost covered on windshield glass in case of rain or in winter so as to provide clear front and rear views for a driver. To this end, the air conditioner introduces external air into the vehicle or circulates the internal air of the vehicle to heat or cool the external or internal air, thus heating and cooling the interior of the vehicle.

The air conditioner includes a compressor, a condenser, an expansion valve, and an evaporator. Cooling the vehicle is conducted in a manner that a refrigerant moves in the order of the compressor, the condenser, the expansion valve, and the evaporator. The compressor is generally located adjacent to an engine to receive power from the engine and thus serves to compress a gaseous refrigerant to high temperature and high pressure. The refrigerant compressed to the high temperature and high pressure through the compressor is introduced into the condenser along a connection pipe, heat-exchanged with external air, and then liquefied. The liquefied refrigerant is sprayed through the expansion valve to a cloud-like form made by mixing liquid and gas. As the high pressure refrigerant is expanded, a lot of heat is lost, and accordingly, the refrigerant becomes a low temperature refrigerant. The low temperature refrigerant is introduced into the evaporator through the connection pipe and then evaporated by the heat of the external air introduced into the interior of the vehicle from the outside of the vehicle, so that the low temperature external air is supplied to the interior of the vehicle.

In case of a small vehicle, the air conditioner is disposed in the interior of a front end module of the vehicle, but in case of a large vehicle, the distance between the front and rear of the vehicle is relatively long, so that the air conditioner is located at a different position from that of the small vehicle. In case of the air conditioner for the large vehicle, generally, a cooling module having a condenser is mounted on top of a vehicle roof, and an evaporator is located on the underside of the vehicle roof.

Figure 1:
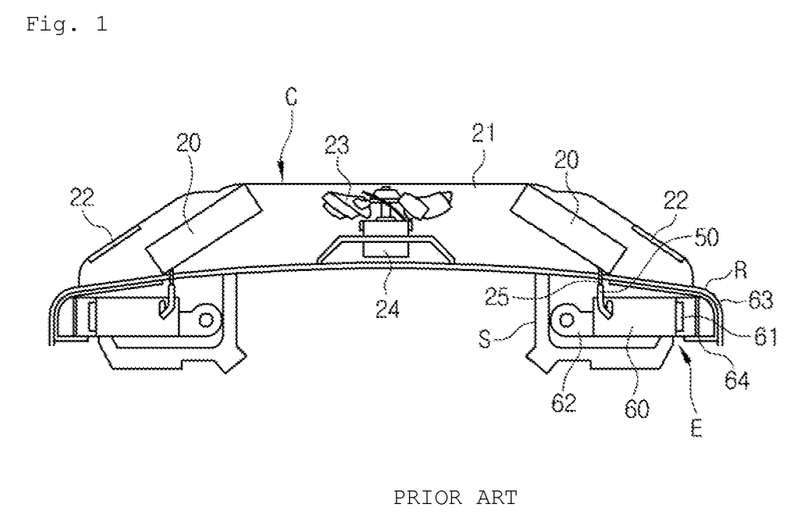
FIG. 1 is a sectional view showing a conventional air conditioner for a large vehicle.

A conventional air conditioner for a large vehicle is disclosed in Korean Patent Application Laid-open No. 10-2011-0004038 (dated on Jan. 13, 2011), which is illustrated in FIG. 1. FIG. 1 is a sectional view showing the conventional air conditioner, wherein the positions of the cooling module and the evaporator disposed in the interior of the large vehicle are schematically illustrated. Referring to FIG. 1 showing the conventional air conditioner for the large vehicle, a condenser unit C is mounted on top of a vehicle roof R, and an evaporator unit E is located on the underside of the vehicle roof R. The condenser unit C is connected with the evaporator unit E by means of a compressed pipe 25. That is, the refrigerant discharged from the condenser unit C passes through an expansion valve 50 via the compressed pipe 25 and is then introduced into the evaporator unit E.

At this time, the vehicle roof R has a fastening hole formed thereon in such a manner to pass a pipe connecting the condenser unit C disposed on top thereof and the evaporator unit E disposed on the underside thereof therethrough. FIG. 1 shows only one compressed pipe 25 passing through the fastening hole formed on the vehicle roof R, but according to conventional practices, the vehicle roof R has another fastening hole formed thereon so as to pass an electric wire supplying electricity to a blower fan 23 of the condenser unit C. Further, separate connection members are fastened to the fastening holes for the fixing and airtightness of the pipe and electric wire passing through the fastening holes of the vehicle roof R, so that the pipe and the electric wire pass through the connection members to connect the condenser unit C and the evaporator unit E with each other.

According to the conventional practices, however, the respective fastening holes passing the pipe and the electric wire therethrough should be formed on the vehicle roof, thus making the manufacturing processes complicated, and further, a plurality of sealing members for the watertightness of the connection members should be required, thus increasing the number of parts.

DISCLOSURE

Technical Problem

Accordingly, the present invention has been made to solve the above-mentioned problems, and it is an object of the present invention to provide a device for fixing a pipe and an electric wire that fastenedly blocks a fastening hole formed on a vehicle roof by means of a first connection member adapted to pass the pipe therethrough and a second connection member adapted to pass the electric wire therethrough, thus reducing the number of fastening holes formed on the vehicle roof and achieving easy assembling.

Technical Solution

To accomplish the above-mentioned object, according to the present invention, there is provided a device for fixing a pipe and an electric wire, the device including: a first connection member having a first through hole adapted to pass the pipe therethrough and a hollow portion formed on a given region thereof; and a second connection member having a second through hole adapted to pass the electric wire therethrough, wherein the second connection member has the corresponding shape to the hollow portion in such a manner as to be integrally formed with the first connection member, so that the first connection member and the second connection member block a fastening hole formed on a given region of a vehicle.

Advantageous Effects

According to the present invention, the device for fixing a pipe and an electric wire is configured wherein the first connection member adapted to pass the pipe therethrough and the second connection member adapted to pass the electric wire therethrough are integrally formed with each other, thus reducing the number of fastening holes formed on the vehicle roof, decreasing the number of parts, and shortening the time consumed for processing.

Further, the first connection member has a stepped portion, so that when the first connection member is fastened to the vehicle roof, it is rigidly fixed thereto, without being escaped from the fastening hole of the vehicle roof.

Furthermore, the hollow portion of the first connection member is open on one side thereof, thus allowing the second connection member to be easily detachable from the hollow portion. Moreover, the first connection member has first corresponding portions formed concavedly or convexedly on given regions of the inner peripheral surface of the hollow portion thereof, and the second connection member has second corresponding portions formed on the outer peripheral surface thereof to the corresponding shapes to the first corresponding portions, so that when the first connection member and the second connection member are fastened to each other, the second connection member is not separated from the first connection member.

Also, the second connection member has a pair of stoppers extended from the top and underside thereof, so that the second connection member is not escaped from the first connection member. Further, the stepped portion of the first connection member has first fastening holes formed thereon, so that the first connection member is fastened to the vehicle roof by means of separate fixing means inserted into the first fastening holes, thus improving the assembling of the first connection member.

In addition, a sealing member is formed on top of the stepped portion of the first connection member, thus enhancing the airtightness thereof. Further, the first connection member has a display part disposed adjacent to the first through hole and protruding from top thereof so as to display the direction of the formation of a second pipe.

Further, there is no need to unify the individual wires to one strand, thus reducing the working time and the material cost, and the watertightness at the individual wires is achieved, thus basically preventing the introduction of water. Furthermore, some of the individual wires are exchanged into new ones if necessary, thus achieving easy maintenance.

MODE FOR INVENTION

Hereinafter, an explanation on a device for fixing a pipe and an electric wire according to the present invention will be in detail given with reference to the attached drawing.

Figure 2:
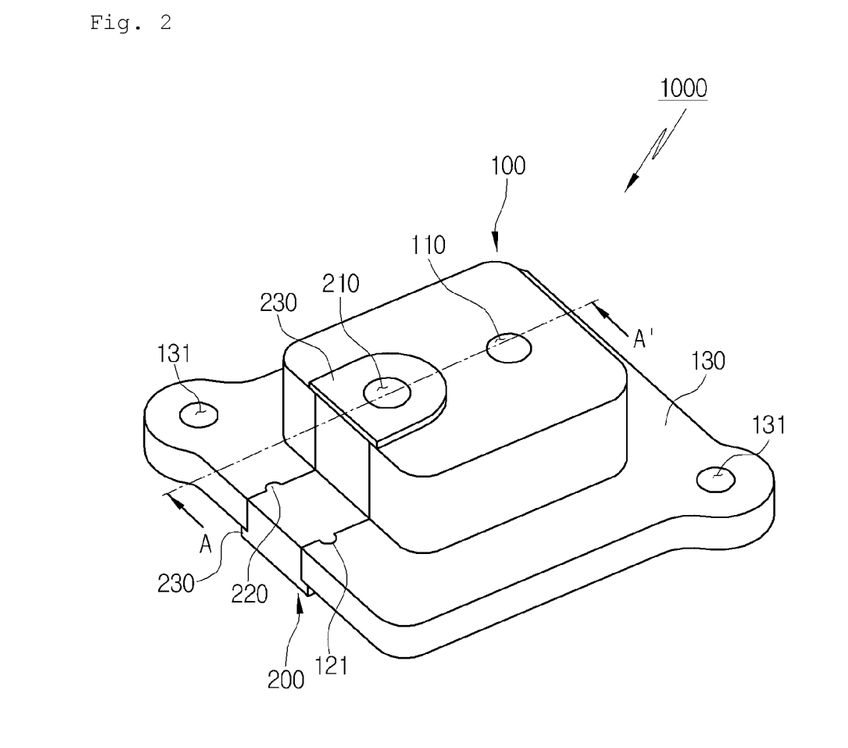
FIG. 2 is a perspective view showing a device for fixing a pipe and an electric wire according to a first embodiment of the present invention.
Figure 3:
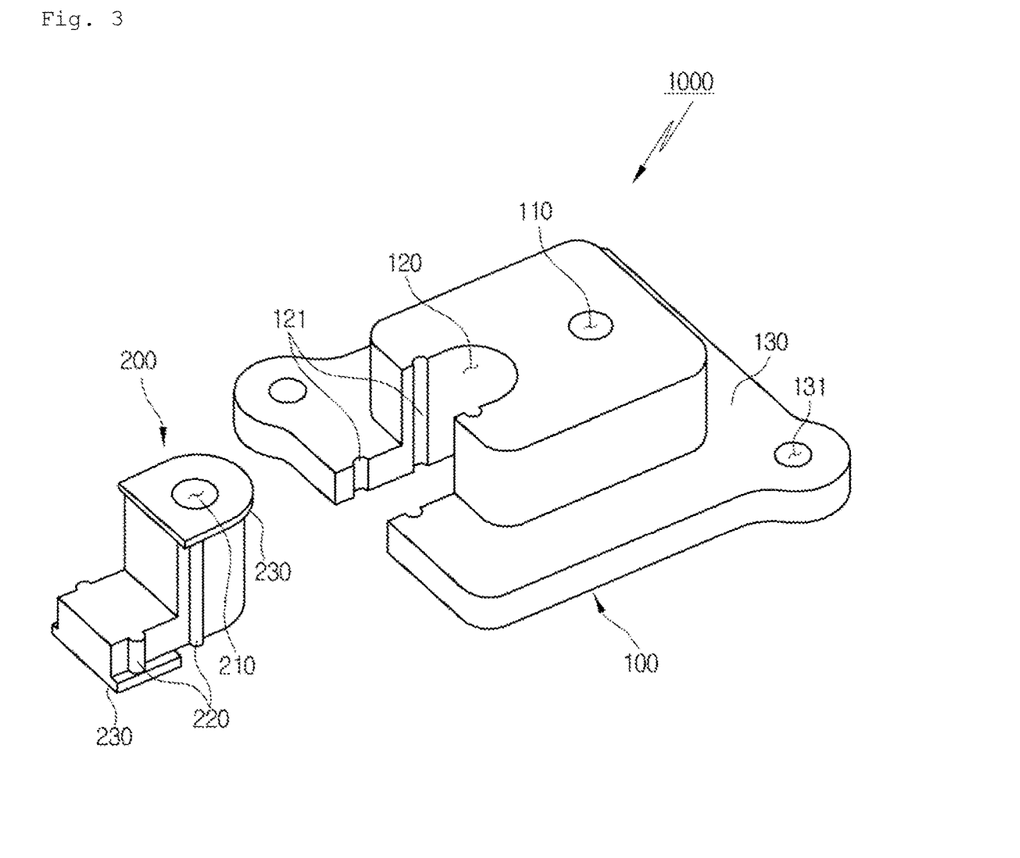
FIG. 3 is a separate perspective view showing the device for fixing a pipe and an electric wire according to the first embodiment of the present invention.
Figure 4:
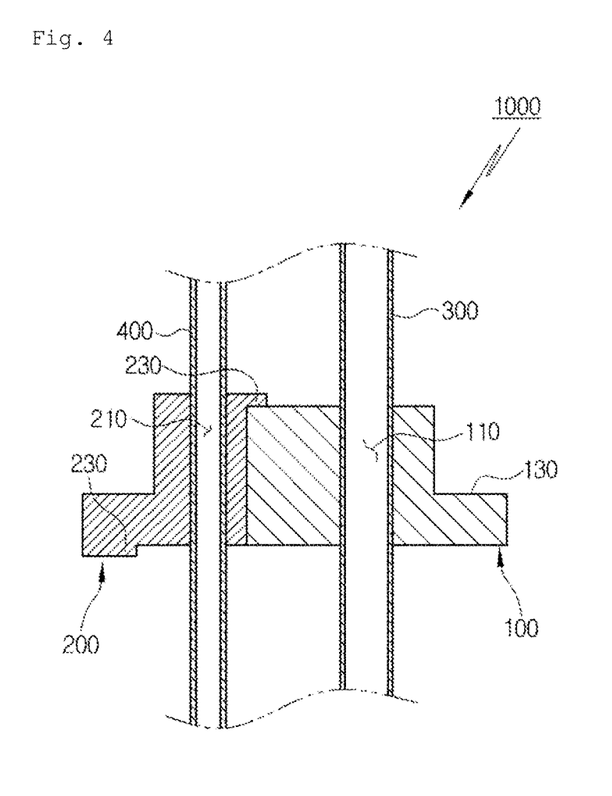
FIG. 4 is a sectional view showing the device for fixing a pipe and an electric wire according to the first embodiment of the present invention.
Figure 5:
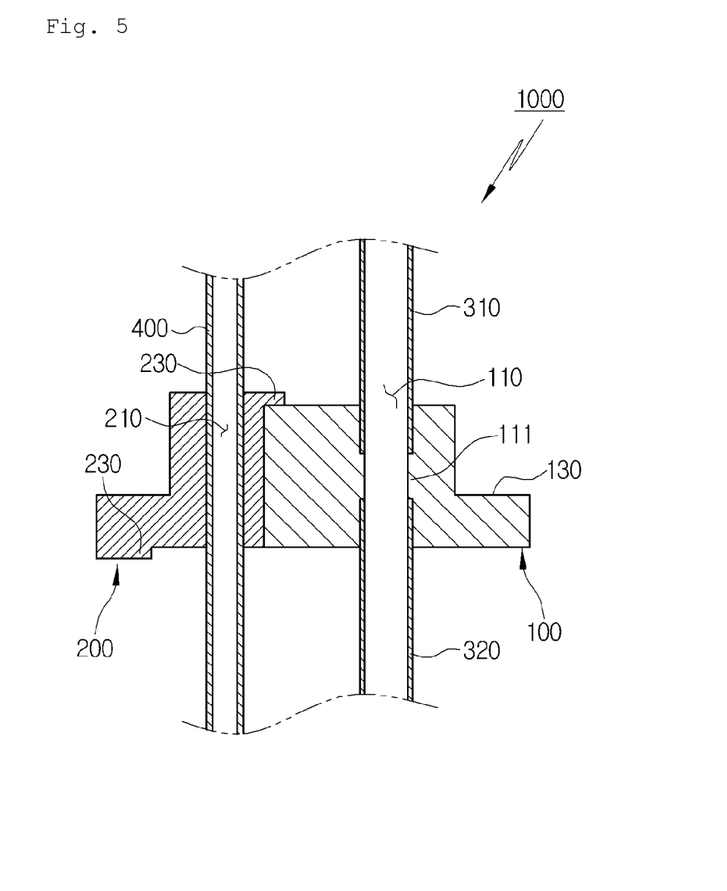
FIG. 5 is a sectional view showing a variation of FIG. 4.
Figure 6:
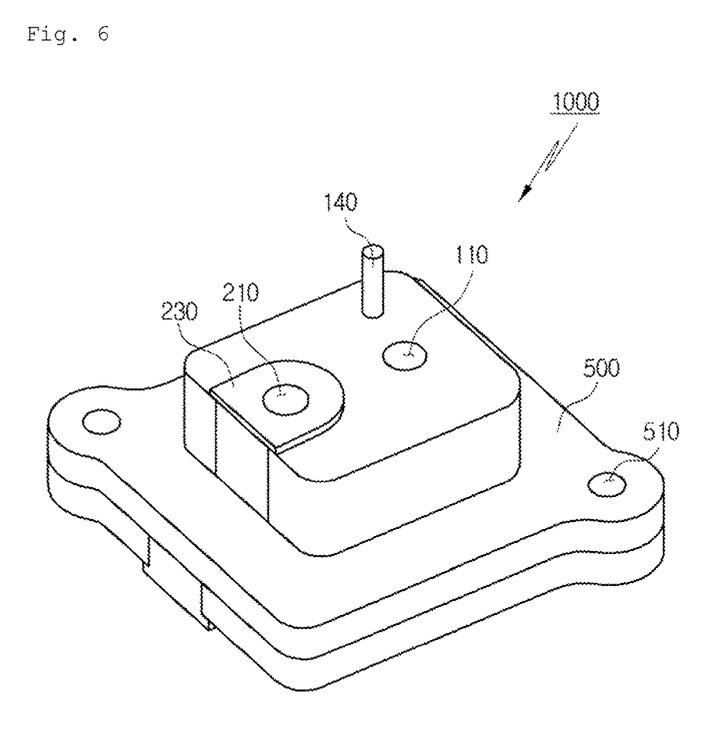
FIG. 6 is a perspective view showing a variation of FIG. 2.
Figure 7:
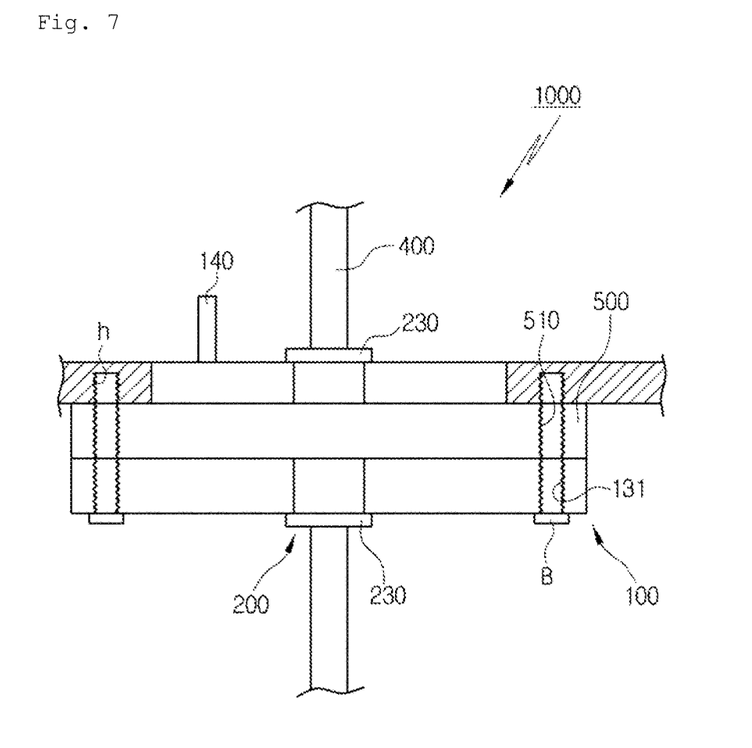
FIG. 7 is a side view of FIG. 6.

FIG. 2 is a perspective view showing a device for fixing a pipe and an electric wire according to a first embodiment of the present invention, FIG. 3 is a separate perspective view showing the device for fixing a pipe and an electric wire according to the first embodiment of the present invention, FIG. 4 is a sectional view showing the device for fixing a pipe and an electric wire according to the first embodiment of the present invention, FIG. 5 is a sectional view showing a variation of FIG. 4, FIG. 6 is a perspective view showing a variation of FIG. 2, and FIG. 7 is a side view of FIG. 6.

As shown in FIGS. 2 to 7, a device 1000 for fixing a pipe 300 and an electric wire 400 according to a first embodiment of the present invention includes: a first connection member 100 having a first through hole 110 and a hollow portion 120 formed thereon; a second connection member 200 having a second through hole 210 formed thereon; the pipe 300 passing through the first through hole 110; and the electric wire 400 passing through the second through hole 210.

The first connection member 100 is fastened to a fastening hole H formed on a vehicle roof R in such a manner as to allow the pipe 300 connecting a condenser C and an evaporator E to pass through the first through hole 110. The first connection member 100 is generally made of an aluminum material and has the first through hole 110 formed piercedly from the top to the bottom thereof, so that the pipe 300 passes through the first through hole 110.

At this time, the first connection member 100 has a stepped portion 130 formed thereon in such a manner as to be fastened to the vehicle roof R.

In more detail, the first connection member 100 has the stepped portion 130 protrudingly formed from the top or underside edges thereof. The stepped portion 130 serves to prevent the first connection member 100 from being escaped from the fastening hole H of the vehicle roof R and at the same time serves to allow the first connection member 100 to be assembled to the vehicle roof R through the formation of first fastening holes 131 as will be discussed later. At this time, if the top edges protrude from the first connection member 100, the first connection member 100 is fastened to the fastening hole H toward the underside of the vehicle roof R from the top of the vehicle roof R, and contrarily, if the underside edges protrude from the first connection member 100, the first connection member 100 is fastened to the fastening hole H toward the top of the vehicle roof R from the underside of the vehicle roof R.

Also, the first connection member 100 has the hollow portion 120 formed at the position close to the first through hole 110. The hollow portion 120 is formed up to one side end of the first connection member 100 in such a manner as to be open to the outside and has a space portion formed therein in such a manner as to allow the first connection member 100 to be fastened to the second connection member 200 as will be discussed later.

On the other hand, the device 1000 for fixing the pipe 300 and the electric wire 400 according to the first embodiment of the present invention includes the second connection member 200 adapted to allow the electric wire 400 to pass therethrough. The second connection member 200 is generally made of an elastic material like rubber and has the second through hole 210 formed piercedly from the top to the bottom thereof, so that the electric wire 400 passes through the second through hole 210.

At this time, the device 1000 according to the first embodiment of the present invention fastens the first connection member 100 and the second connection member 200 to each other.

In more detail, the second connection member 200 is formed to the corresponding shape to the hollow portion 120 of the first connection member 100 in such a manner as to be insertedly fastened to the hollow portion 120 of the first connection member 100. Accordingly, the device 100 according to the present invention does not have any fastening hole H for passing the electric wire 400 therethrough on the vehicle roof R, thus reducing the number of parts and achieving easy manufacturing.

In this case, the first connection member 100 has first corresponding portions 121 formed concavedly or convexedly on given regions of the inner peripheral surface of the hollow portion 120 thereof, and the second connection member 200 has second corresponding portions 220 formed on the outer peripheral surface thereof to the corresponding shapes to the first corresponding portions 121. As shown in FIG. 3, the first corresponding portions 121 are concavedly formed, and the second corresponding portions 220 are convexedly formed. The formation of the first corresponding portions 121 and the second corresponding portions 220 prevents the second connection member 200 from being escaped from the first connection member 100, thus enhancing the fastening force therebetween.

Further, the device 100 according to the present invention has a pair of stoppers 230 extended from the top and underside of the second connection member 200 in such a manner as to be brought into close contact with the top and underside of the first connection member 100. FIG. 4 is a sectional view taken along the line A-A of FIG. 2, wherein the stoppers 230 come into close contact with the top and underside of the first connection member 100. The stoppers 230 serve to prevent the second connection member 200 from being escaped from the first connection member 100, thus enhancing the fastening force therebetween.

At this time, if the second connection member 200 having the second corresponding portions 220 and the pair of stoppers 230 is fastened to the first connection member 100, the second connection member 200 is fastenedly inserted into the hollow portion 120 from the side of the first connection member 100 by means of the elasticity of the second connection member 200 and the second corresponding portions 220.

Referring to FIG. 5, the device 100 according to the present invention includes a first pipe 310 and a second pipe 320 adapted to pass through the first through hole 110, so that the first pipe 310 and the second pipe 320 pass through the first through hole 110 and are fastened thereto.

In more detail, the device 100 according to the present invention includes the first pipe 310 connecting the first connection member 100 and the condenser C with each other and the second pipe 320 connecting the first connection member 100 and the evaporator E with each other, so that the first pipe 310 is inserted into the first through hole 110 toward the underside of the first connection member 100 from the top of the first connection member 100, while the second pipe 320 is being inserted into the first through hole 110 toward the top of the first connection member 100 from the underside of the first connection member 100, and the first pipe 310 and the second pipe 320 are fastened to the first connection member 100. At this time, the first pipe 310 and the second pipe 320 are fastened to the first connection member 100 by means of brazing, and after they are fastened to the first connection member 100, next, the first through hole 110 of the first connection member 100 serves as a passage through which a refrigerant passes.

As a result, the device 100 according to the present invention fastens the first connection member 100 to the vehicle roof R and then fastens the pipe 300 connecting the condenser C and the evaporator E to the first connection member 100, thus allowing the process order to be more freely determined.

At this time, the first connection member 100 has a stepped fixing portion 111 formed in the interior of the first through hole 110 to fix the positions of the first pipe 310 and the second pipe 320 when fastened to each other. The stepped fixing portion 111 is formed convexedly from the top and underside of the first through hole 110 toward the center of the first through hole 110 and serves to adjust the insertion depths of the first pipe 310 and the second pipe 320. Accordingly, the first pipe 310 and the second pipe 310 are seated on the stepped fixing portion 111 and fastened to the first connection member 100 by means of brazing.

Referring to FIGS. 6 and 7, the device 1000 according to the present invention includes the first fastening holes 131 formed on the stepped portion 130 of the first connection member 100, so that the first connection member 100 is fastened to the vehicle roof R by means of separate fixing means B inserted into the first fastening holes 131. At this time, the vehicle roof R further includes fastening holes h formed at positions corresponding to the first fastening holes 131. The fixing means B includes bolts, rivets and the like, and in addition thereto, the device 1000 according to the present invention may have various fixing members.

Further, the inner peripheral surfaces of the first fastening holes 131 are formed correspondingly to the outer peripheral surfaces of the fixing means B. For example, if the fixing means B used in the device 1000 of the present invention is a bolt, screw threads are formed along the inner peripheral surfaces of the first fastening holes 131.

Accordingly, the first connection member 100 is fixed to the vehicle roof R through the first fastening holes 131, thus achieving the improvement of assembly thereof.

Furthermore, the device 1000 according to the first embodiment of the present invention includes a sealing member 500 disposed on top of the stepped portion 130 of the first connection member 100 to maintain the airtightness against the outside of the vehicle roof R. The sealing member 500 is formed on top of the stepped portion 130 of the first connection member 100, while surrounding the edges of the first connection member 100.

Through the formation of the sealing member 500, accordingly, the device 1000 according to the first embodiment of the present invention prevents water and foreign matters from being introduced thereinto from the outside of the vehicle roof R, and at the same time, the device 1000 needs one sealing member 500 through the integration of the first connection member 100 and the second connection member 200, thus reducing the number of parts and the material cost.

Further, the sealing member 500 has second fastening holes 510 formed at the corresponding positions to the first fastening holes 131 of the first connection member 100. Accordingly, the fixing means B pass through the first fastening holes 131 and the second fastening holes 510 to allow the first connection member 100 to be fastened to the vehicle roof R. In the same manner as the first fastening holes 131, at this time, the inner peripheral surfaces of the second fastening holes 510 are formed correspondingly to the outer peripheral surfaces of the fixing means B.

On the other hand, the first connection member 100 has a display part 140 located adjacent to the first through hole 110 in such a manner as to protrude from top thereof. At this time, the display part 140 serves to display the direction of the formation of the second pipe 320. When the first connection member 100 is fastened to the vehicle roof R, accordingly, the fastening direction of the first connection member 100 is not reversed.

Figure 8:
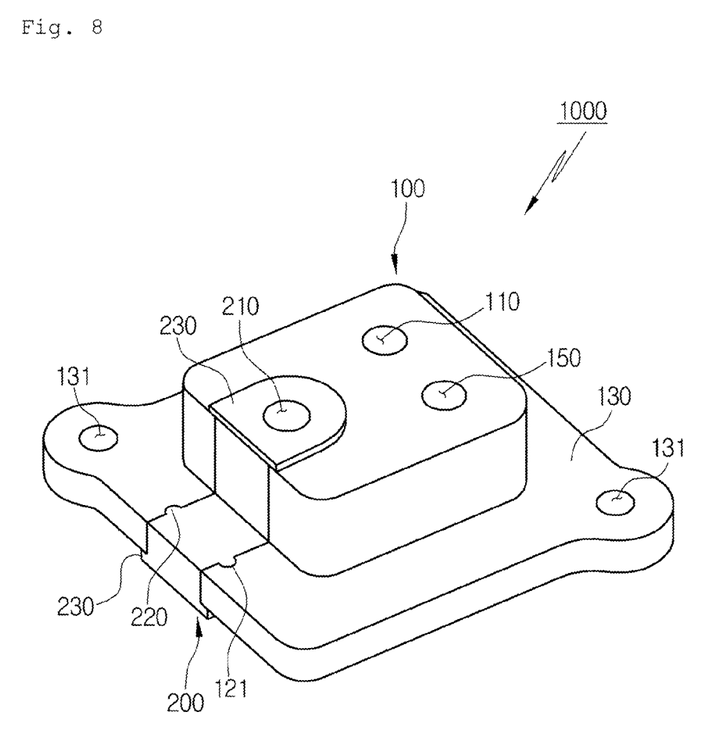
FIG. 8 is a perspective view showing another variation of FIG. 2.

FIG. 8 is a perspective view showing another variation of FIG. 2. Referring to FIG. 8, the first connection member 100 further has a third through hole 150 if there are two evaporators E in the interior of the vehicle.

That is, the device 1000 according to the present invention is configured wherein the pipe 300 connected to the condenser C located at the outside of the vehicle passes through the first through hole 110 and the third through hole 150 of the first connection member 100 in such a manner as to be connected to the two evaporators E located at the inside of the vehicle. Accordingly, even if there are the two evaporators E, the device 1000 according to the present invention forms only one fastening hole H on the vehicle roof R.

Figure 9:
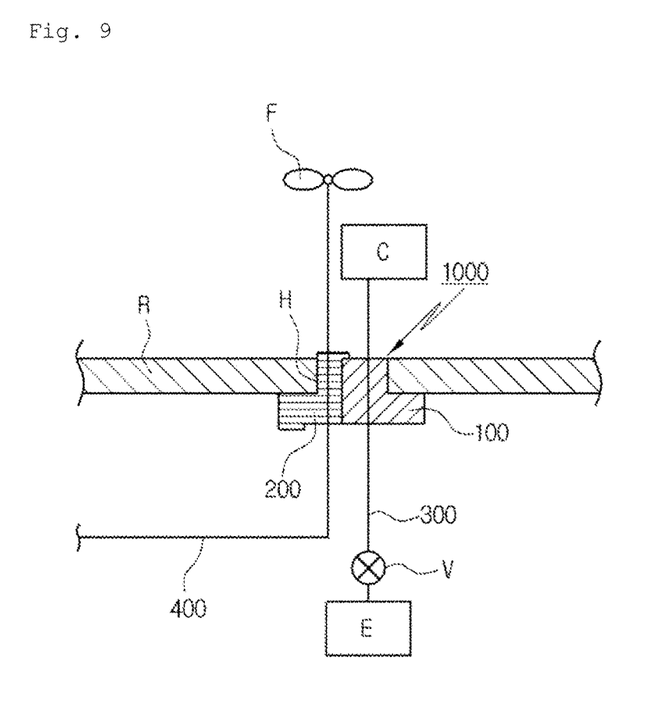
FIG. 9 is a schematic view showing the device for fixing a pipe and an electric wire according to the first embodiment of the present invention.
Figure 10:
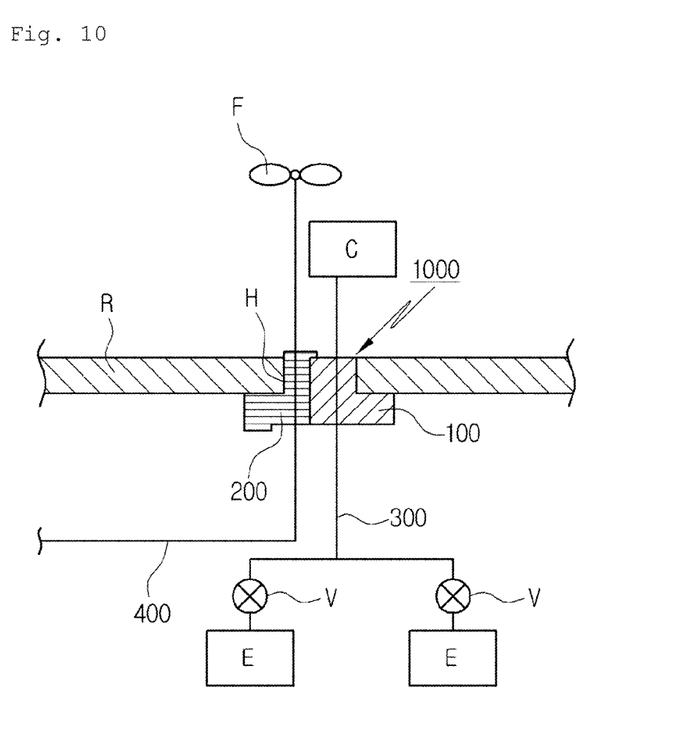
FIG. 10 is a schematic view showing a variation of FIG. 9.

Referring next to FIGS. 9 and 10, an explanation on a general cooling system will be briefly given.

A gaseous refrigerant, which is compressed to high temperature and high pressure by means of a compressor (not shown) fastened to an engine of the vehicle to receive power from the engine, is conveyed to the condenser C located on top of the vehicle roof R along a refrigerant connection pipe (not shown) and cooled by external air. The liquid refrigerant cooled by the condenser C passes through the first connection member 100 and an expansion valve V along the pipe 300 and is then introduced into the evaporator E located inside the vehicle. The refrigerant introduced into the evaporator E cools the air introduced into the vehicle from the outside of the vehicle, and the vehicle is cooled by the cooled air. The refrigerant, which is heat-exchanged with the external air, is circulated repeatedly through the compressor, the condenser C, the expansion valve V, and the evaporator E.

At this time, the device 1000 according to the present invention includes only one expansion valve V or a plurality of expansion valves V corresponding to the number of evaporators E. Referring to FIG. 10, the device 1000 according to the present invention is configured wherein the pipe 300 connected to the condenser C is branched into two pipes in the interior of the vehicle and the respective pipes are connected to the expansion valves V connected correspondingly to the evaporators E.

Further, the device 1000 according to the present invention may be configured wherein only one expansion valve V is disposed on top of the vehicle roof R (at the outside thereof) and the pipe 300 is branched into two pipes in the interior of the vehicle in such a manner as to be connected correspondingly to the two evaporators E.

In case of the device 1000 according to the present invention as shown in FIG. 8, moreover, the pipe 300 is branched into two pipes on top of the vehicle roof R, and after the two pipes pass through the first through hole 110 and the third through hole 150, they are connected to the evaporators E.

As the device 1000 according to the present invention is integrally formed, as shown in FIG. 9, only one fastening hole H is formed on the vehicle roof R so as to pass the pipe 300 and the electric wire 400 therethrough from the interior of the vehicle to the outside of the vehicle, thus reducing the number of parts and the material cost and achieving easy assembling.

Figure 11:
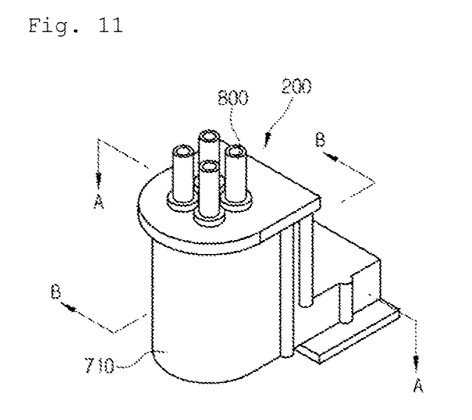
FIG. 11 is a perspective view showing a device for fixing a pipe and an electric wire according to a second embodiment of the present invention.
Figure 12:
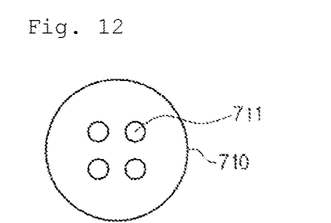
FIG. 12 is a sectional view taken along the line A-A of FIG. 11.
Figure 13:
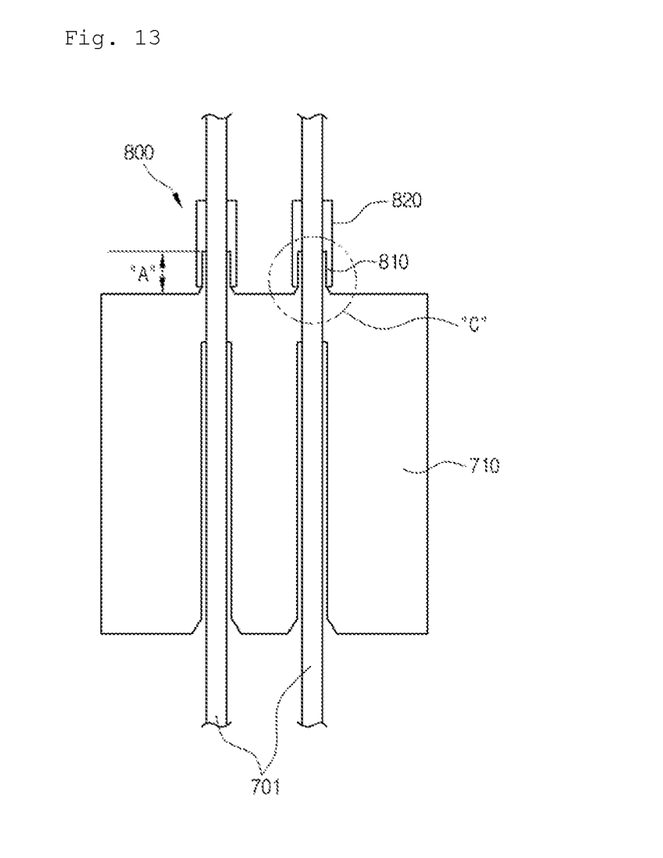
FIG. 13 is a sectional view taken along the line B-B of FIG. 11.
Figure 14:
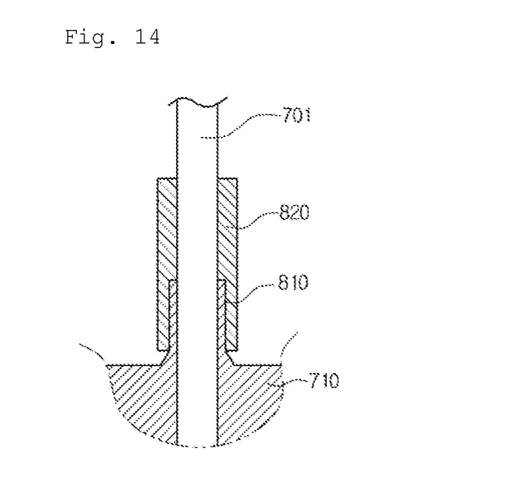
FIG. 14 is an enlarged sectional view showing a portion "C" of FIG. 11.
Figure 15:
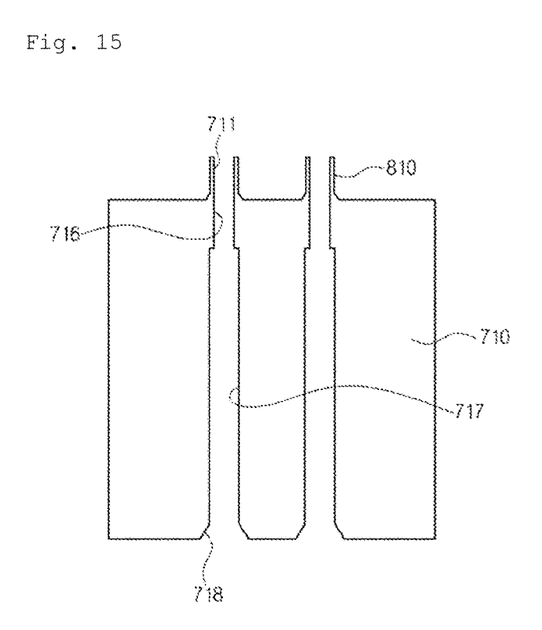
FIG. 15 is a sectional view showing the state wherein the electric wire of FIG. 11 is separated.

On the other hand, FIG. 11 is a perspective view showing a device for fixing a pipe and an electric wire according to a second embodiment of the present invention, FIG. 12 is a sectional view taken along the line A-A of FIG. 11, FIG. 13 is a sectional view taken along the line B-B of FIG. 11, FIG. 14 is an enlarged sectional view showing a portion "C" of FIG. 11, and FIG. 15 is a sectional view showing the state wherein the electric wire of FIG. 11 is separated.

As shown in FIGS. 11 to 15, a device for fixing a pipe and an electric wire according to a second embodiment of the present invention includes a second connection member 200 as will be discussed below.

The second connection member 200 is fixed to a vehicle body and adapted to pass wire rings connecting interior and exterior electric devices to each other therethrough, thus improving watertightness performance. The second connection member 200 includes a body 710 and a plurality of individual watertight parts 800.

The body 710 is fixedly mounted to the vehicle body and has a plurality of through holes 711. Individual wires 701 pass through the plurality of through holes 711. The number of through holes 711 is formed correspondingly to the number of individual wires 701 passing through the through holes 711. Under the above-mentioned configuration, accordingly, there is no need to unify the individual wires to one strand, thus reducing the working time and the material cost.

According to the second embodiment of the present invention, the four through holes 711 are formed adjacent to one another, but they may be appropriately formed dispersedly to desired positions.

The individual watertight parts 800 are adapted to allow the individual wires 701 passing through the through holes 711 to be watertight. The individual watertight parts 800 serve to individually fill the gaps between the through holes 711 and the individual wires 701, thus solving the watertight problems occurring in the configuration wherein the individual wires 701 pass through the respective through holes 711.

That is, the individual watertight parts 800 remove the weaknesses generated from the configuration wherein the individual wires 701 pass through the respective through holes 711 so as to reduce the working time and the material cost, and accordingly, the formation of the individual watertight parts 800 allows the watertight performance to be more improved.

In more detail, each individual watertight part 800 has a protruding portion 810. The protruding portion 810 has a shape of a cylinder extended protrudingly from the body 710 in a longitudinal direction of the through hole 711 by a given length A. The protruding portion 810 is adapted to surround the outer peripheral surface of each individual wire 701 to allow the gap between the corresponding individual wire 701 and the through hole 711 to be filled.

Further, the protruding portion 810 is adapted to stably support the corresponding individual wire 701, so that even if the individual wire 701 is suddenly bent, the gap between the corresponding individual wire 701 and the through hole 711 is not formed. If the individual wire 701 is suddenly bent in the state of passing through the through hole 711, the individual wire 701 moves along the gap generated in the radial direction of the through hole 711, and at this time, the protruding portion 801 surrounds the outer peripheral surface of the individual wire 710 by the given length A, thus preventing the individual wire 701 from moving along the gap.

Further, each individual watertight part 800 includes a heat sealable tube 820. The heat sealable tube 820 surrounds the outer peripheral surface of the protruding portion 810 in such a manner as to be extended in a direction in which the individual wire 701 is drawn to fill the gap between the individual wire 701 and the through hole 711. So as to make up for the watertightness of the protruding portion 810 against the gap between the individual wire 701 and the through hole 711, the heat sealable tube 820 surrounds the protruding portion 810 and the individual wire 701 again to allow the gap between the individual wire 701 and the through hole 711 to be secondarily filled.

Through the configuration wherein the heat sealable tube 820 surrounds the outer peripheral surface of the protruding portion 810, in this case, the protruding portion 810 serves as a seating portion for the heat sealable tube 820.

Further, the through hole 711 has a force fitting section 716 having a smaller diameter than the individual wire 701. The hole diameter of the force fitting section 716 is in the range of 90 to 95% of the diameter of the individual wire 701, so that the individual wire 701 is forcedly fitted to the through hole 711. In this case, the body 710 is made of a rubber material, so that the individual wires 701 are fitted to the through holes 711 by means of the elastic deformation of the body 710.

Moreover, each through hole 711 has an expanded section 717 having a larger diameter than the force fitting section 716 and a tapered section 718 expanded in diameter toward the end of the expanded section 717. The force fitting section 716 is formed adjacent to the protruding portion 810 in the longitudinal direction of the through hole 711, and the expanded section 717 is formed on the opposite side to the protruding portion 810 in the longitudinal direction of the through hole 711.

Accordingly, the individual wire 701 is rigidly fixed to the body 710 through the protruding portion 810 and the force fitting section 716 from one side of the through hole 711 in the longitudinal direction of the through hole 711 and is bent to a desired direction through the expanded section 717 from the other side of the through hole 711. If the individual wire 701 is suddenly bent at a portion drawn from the through hole 711, the tapered section 718 allows the bent section to be gentle to prevent the individual wire 701 from being deformed and further to keep the gap in the radial direction of the through hole 711 from being generated.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A device for fixing a pipe and an electric wire, the device comprising:
   a first connection member having a first through hole adapted to pass the pipe therethrough and a hollow portion formed on a given region thereof; and
   a second connection member having a second through hole adapted to pass the electric wire therethrough,
   wherein the second connection member has a shape that corresponds with a shape of the hollow portion in such a manner as to be integrally formed with the first connection member, so that the first connection member and the second connection member block a fastening hole formed on a given region of a vehicle.

2. The device according to claim 1, wherein the fastening hole is formed on the given region of a vehicle roof, and the pipe connects a condenser disposed at an outside of the vehicle roof with an evaporator disposed at an inside of the vehicle, while the electric wire supplying power to a fan and shroud assembly.

3. The device according to claim 1, wherein the first connection member has a stepped portion formed protrudingly from a top edge or an underside edge thereof.

4. The device according to claim 3, wherein the pipe has a first pipe connected to the condenser and a second pipe connected to the evaporator, and the first pipe and the second pipe are inserted integrally into the first through hole from a top and an underside of the first connection member.

5. The device according to claim 3, wherein the hollow portion of the first connection member is open on one side thereof.

6. The device according to claim 5, wherein the first connection member has first corresponding portions formed concavedly or convexedly on given regions of an inner peripheral surface of the hollow portion thereof, and the second connection member has second corresponding portions formed on an outer peripheral surface thereof that correspond with the first corresponding portions.

7. The device according to claim 6, wherein the second connection member has a pair of stoppers extended from a top and underside thereof in such a manner as to be brought into close contact with the top and underside of the first connection member.

8. The device according to claim 3, wherein the stepped portion of the first connection member has first fastening holes formed on given regions thereof, so that the first connection member is fastened to the vehicle roof by means of separate fixing means inserted into the first fastening holes.

9. The device according to claim 8, further comprising a sealing member formed to the corresponding shape to a region on which the stepped portion of the first connection member is formed and having second fastening holes piercedly formed correspondingly to the first fastening holes in such a manner as to be disposed between the stepped portion of the first connection member and the vehicle roof.

10. The device according to claim 9, wherein the first connection member has a display part disposed adjacent to the first through hole and protruding from top thereof so as to display the direction of the formation of the second pipe.

11. The device according to claim 1, wherein the first connection member further has a third through hole adapted to pass the pipe therethrough.

12. The device according to claim 1, wherein the second connection member comprises:
- a body having a plurality of through holes adapted to pass individual wires therethrough; and
- a plurality of individual watertight parts adapted to provide watertightness to the individual wires passing through the through holes.

13. The device according to claim 12, wherein each individual watertight part has a protruding portion extended protrudingly from the body in a longitudinal direction of the through hole in such a manner as to surround an outer peripheral surface of each individual wire.

14. The device according to claim 13, wherein each individual watertight part comprises a heat sealable tube adapted to surround an outer peripheral surface of the protruding portion in such a manner as to be extended in a direction in which the individual wire is drawn to fill the gap between the individual wire and the through hole.

15. The device according to claim 13, wherein the through hole has a force fitting section having a smaller diameter than the individual wire and an expanded section having a larger diameter than the force fitting section.

16. The device according to claim 15, wherein the through hole has a tapered section expanded in diameter toward an end of the expanded section.

17. The device according to claim 15, wherein the force fitting section is formed adjacent to the protruding portion in the longitudinal direction of the through hole, and the expanded section is formed on the opposite side to the protruding portion in the longitudinal direction of the through hole.

* * * * *